US 11,233,846 B2

(12) United States Patent
Khalid (10) Patent No.: US 11,233,846 B2
(45) Date of Patent: Jan. 25, 2022

(54) EDGE COMPUTE SYSTEMS AND METHODS

(71) Applicant: Verizon Patent and Licensing Inc., Arlington, VA (US)

(72) Inventor: Mohammad Raheel Khalid, Budd Lake, NJ (US)

(73) Assignee: Verizon Patent and Licensing Ines, Basking Ridge, NJ (US)

( * ) Notice: Subject to any disclaimer, the term of this patent is extended or adjusted under 35 U.S.C. 154(b) by 0 days.

(21) Appl. No.: 16/847,399

(22) Filed: Apr. 13, 2020

(65) Prior Publication Data

US 2020/0244723 A1 Jul. 30, 2020

Related U.S. Application Data

(63) Continuation of application No. 15/861,461, filed on Jan. 3, 2018, now Pat. No. 10,659,526.

(51) Int. Cl.
| | | |
|---|---|---|
| *H04L 29/08* | (2006.01) | |
| *G06F 3/06* | (2006.01) | |
| *G06F 16/178* | (2019.01) | |
| *G06F 9/50* | (2006.01) | |
| *G06F 3/01* | (2006.01) | |

(52) U.S. Cl.
CPC .......... *H04L 67/1021* (2013.01); *G06F 3/067* (2013.01); *G06F 9/50* (2013.01); *G06F 16/178* (2019.01); *H04L 67/10* (2013.01); *G06F 3/011* (2013.01)

(58) Field of Classification Search
CPC ... H04L 67/1021; H04L 67/10; G06F 16/178; G06F 3/067; G06F 3/011; G06F 9/50
See application file for complete search history.

(56) References Cited

U.S. PATENT DOCUMENTS

| | | | |
|---|---|---|---|
| 2015/0055623 A1 | 2/2015 | Li et al. | |
| 2015/0138977 A1* | 5/2015 | Dacosta | H04W 28/021 370/235 |
| 2017/0132568 A1* | 5/2017 | Glunz | G06Q 10/101 |
| 2017/0164237 A1 | 6/2017 | Mahmoodi et al. | |
| 2017/0230451 A1* | 8/2017 | Paramasivam | H04L 67/22 |
| 2017/0353397 A1 | 12/2017 | Che | |
| 2018/0117446 A1* | 5/2018 | Tran | A42B 3/0433 |
| 2018/0131765 A1* | 5/2018 | Puleston | G06F 16/907 |
| 2018/0295134 A1* | 10/2018 | Gupta | H04L 67/28 |

OTHER PUBLICATIONS

Lambda Architecture, Wikipedia, https://en.wikipedia.org/wiki/Lambda_architecture, as accessed on Nov. 30, 2017.
Satyanarayanan, et al., The Emergence of Edge Computing, Computing in Science & Engineering, published by the IEEE Computer Society, Jan. 2017.

* cited by examiner

*Primary Examiner* — Kristie D Shingles (57) ABSTRACT

An exemplary system includes a cloud server configured to provide a service to a client device by way of a network. The system further includes an edge computing device configured to provide, from an edge of the network to the client device, a latency-sensitive task associated with the service. The cloud server and the edge computing device are configured to operate on distinct and matching datasets to provide the service to the client device.

20 Claims, 6 Drawing Sheets

EDGE COMPUTE SYSTEMS AND METHODS

RELATED APPLICATIONS

This application is a continuation application of U.S. patent application Ser. No. 15/861,461, filed Jan. 3, 2018, and entitled "Edge Compute Systems and Methods," which is hereby incorporated by reference in its entirety.

BACKGROUND INFORMATION

A client-server model is commonly employed to execute computing applications. In such a model, tasks of an application are typically distributed between a server and a client in accordance with a predetermined, static partition that is defined prior to runtime. The client may perform certain tasks using resources of a client device on which the client is installed and may offload the performance of other tasks by requesting that the server perform the other tasks using resources of a server device on which the server is installed. It is common for computationally intensive tasks to be assigned to the server to utilize the computing resources of the server device, which resources are typically greater than the resources of the client device.

However, latency of data communications between the client and the server in a traditional client-server architecture, such as a traditional cloud-service architecture, may be too great to allow latency-sensitive tasks of an application to be assigned to the server. In addition, the limited resources of the client device may preclude the client from performing latency-sensitive tasks that are computationally intensive. Moreover, scaling a traditional client-server architecture to virtualize client device compute is linear and therefore not economical.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary edge compute systems and methods are described herein. Systems and methods described herein provide an architecture that provides low-latency data communications over a network and utilizes the low-latency data communications and network-based computing resources to optimize performance of computing tasks of an application executing on a client device, particularly performance of computing tasks that are computationally intensive and/or latency sensitive. For example, systems and methods described herein may leverage low-latency data communications and a distributed data-processing architecture to offload performance of select computing tasks of the application to one or more edge computing devices while performing other select computing tasks of the application at the client device. This may allow offloading of certain latency-sensitive and/or computationally intensive tasks that previously could not be offloaded from the client device due to latencies and configurations of conventional data-processing architectures.

In certain exemplary systems and methods described herein, a cloud server may be configured to provide a service to a client device by way of a network. The cloud server may implement a batch layer of a data-processing architecture. An edge computing device may implement a speed layer of the data-processing architecture, which speed layer may be configured to provide one or more latency-sensitive components or tasks associated with the service to the client device in response to one or more requests from the client device to offload the one or more latency-sensitive components or tasks. The edge computing device may be separate from and communicatively coupled to the cloud server and may be located at an edge of the network such that a latency of data communications between the edge computing device and the client device is lower than a latency of data communications between the cloud server and the client device. With a speed layer of the data-processing architecture implemented at the edge of the network, speed layer computing tasks associated with a service (e.g., speed layer computing tasks of an application) may be performed at the edge of the network where latency of data communications with the client device are generally lower than latency of data communications between the client device and the cloud server. This may improve the speed in which the client device receives results of offloaded computing tasks when compared to conventional architectures in which a speed layer and a batch layer are implemented together in a cloud server data center. The improved speed may allow the client device to offload computing tasks that are latency sensitive and/or computationally intensive in a manner that may facilitate optimized performance of the application and/or improved user experience with the application. Examples of such optimizations are described herein.

Systems and methods described herein may provide additional or alternative features and benefits as may serve a particular implementation. Various embodiments will now be described with reference to the figures. The disclosed embodiments may provide one or more of the features and benefits mentioned above and/or various additional and/or alternative features and benefits that will be made apparent herein.

Figure 1:
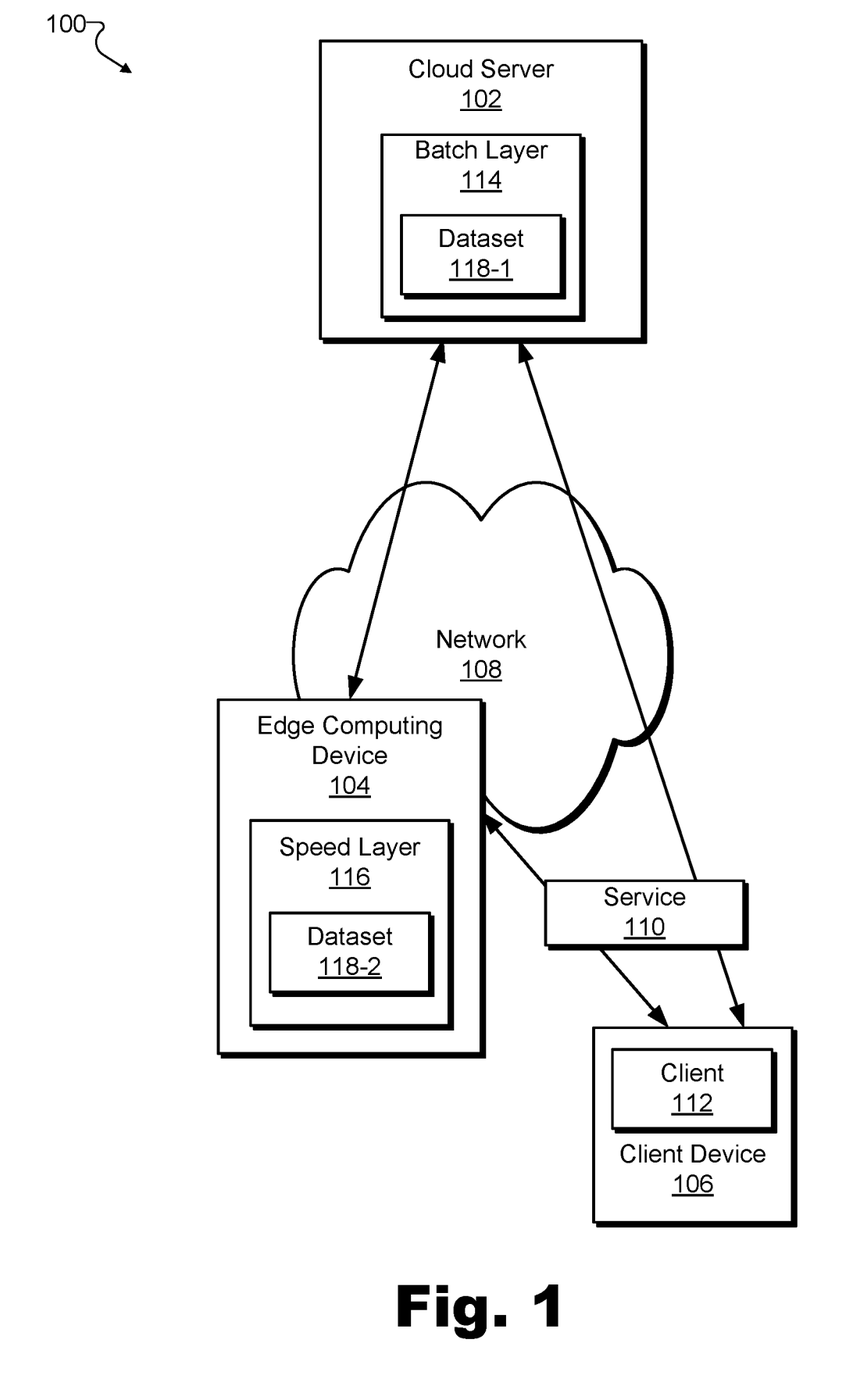
FIG. 1 illustrates an exemplary edge compute system according to principles described herein.

FIG. 1 illustrates an exemplary edge compute system 100 ("system 100") configured in accordance with methods and systems described herein. As shown, system 100 may include, without limitation, a cloud server 102, an edge computing device 104, and a client device 106 communicatively coupled one to another by way of a network 108. Cloud server 102 and edge computing device 104 may operate in tandem to provide a service 110 over network 108 for access by a client 112 implemented by client device 106.

Network 108 may include any provider-specific wired or wireless network (e.g., a cable or satellite carrier network or a mobile telephone network), the Internet, the World Wide Web, a wide area network, any other suitable network, or any combination of such networks. Data communications may flow between cloud server 102, edge computing device 104, and client device 106 via network 108 using any communication technologies, devices, media, and protocols supportive of data communications, including, but not limited to, socket connections, Ethernet, data transmission media, communication devices, Transmission Control Protocol ("TCP"), Internet Protocol ("IP"), Hypertext Transfer Protocol ("HTTP"), HTTPS, Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), third-generation ("4G") wireless network technologies, fourth-generation ("4G") wireless network technologies such as 4G Long Term Evolution ("LTE") technologies, fifth-generation ("5G") wireless network technologies, Time Division Multiple Access ("TDMA") technologies, radio frequency ("RF") signaling technologies, wireless communication technologies, in-band and out-of-band signaling technologies, and other suitable communications technologies. While only one network 108 is shown to interconnect cloud server 102, edge computing device 104, and client device 106 in FIG. 1, it will be recognized that cloud server 102, edge computing device 104, and client device 106 may communicate with one another by way of one or more interconnected networks as may serve a particular implementation.

Network 108 may provide for low-latency data communications with client device 106, including low-latency data communications between edge computing device 104 and client device 106. For example, in certain examples, network 108 may provide latencies between about one and twenty milliseconds, and preferably less than about five milliseconds (e.g., less than ten milliseconds round trip) for data communications between edge computing device 104 and client device 106 and between about twenty and one hundred milliseconds, such as about fifty milliseconds or more (e.g., about one hundred milliseconds or more round trip) for data communications between cloud server 102 and client device 106.

In certain implementations, network 108 may include a mobile wireless network to which client device 106 may connect. To this end, network 108 may include appropriately configured components of a mobile wireless network such as radio access networks, wireless communication base stations, eNodeB elements, central offices, backhaul networks, core networks, etc. In certain implementations, network 108 may provide low-latency data communications, such as those described above, by implementing 5G wireless network technologies.

Components of system 100 may be configured to utilize low latencies of network 108 to optimize service 110 and/or client 112, such as in any of the ways described herein. Such optimizations may result from and/or lead to optimal usage of computing resources and/or improved user experiences with service 110 and/or client 112. Examples of such optimizations are described herein.

Client device 106 may include any computing device configured to perform client-side operations described herein. Client device 106 may include, without limitation, a mobile phone device such as a smartphone device, a tablet computer, a personal desktop or laptop computer, a gaming device, a virtual reality device such as a virtual reality headset, an augmented reality device such as an augmented reality headset, a media player device configured to receive, process, and present media content, and/or any other computing device or combination of computing devices configured to access service 110 over network 108.

Client device 102 may implement client 112, which may include a client application installed and configured to execute on client device 102. Client 112 may be configured to direct client device 102 to perform one or more of the client-side operations described herein. Client 112 may be implemented as software, firmware, hardware, or any suitable combination thereof. Client 112 may be configured to access service 110 over network 108 and direct client device 102 to perform operations to provide a user of client device 102 with a user experience based on service 110. Client 112 may include a virtual reality client, an augmented reality client, an artificial intelligence client, a media player client, a virtual assistant client, and/or any other client that may be implemented by client device 106.

Client 112 may include various components and may perform various tasks associated with the components and/or request performance of various tasks associated with the components. In certain examples, at least some of the components and associated tasks are latency sensitive and/or computationally intensive. As an example, client 112 may include a virtual reality client including a rendering component and associated tasks for rendering views of a virtual reality world for presentation to a user of client device 106. The rendering component and associated tasks may be latency sensitive and computationally intensive. As another example, client 112 may include an augmented reality client including a computer vision object recognition component and associated tasks for detecting object attributes that trigger generation of augmented reality views. The image recognition component and associated tasks may be latency sensitive and computationally intensive. As another example, client 112 may include an application having an artificial intelligence component and associated tasks that are latency sensitive and computationally intensive. As another example, client 112 may include an application (e.g., a drone navigation application, an autonomous driving application, etc.) having a computer vision component and associated tasks that are latency sensitive and computationally intensive.

A component and/or associated tasks may be latency sensitive in that client 112 running on client device 106 may have specific latency requirements within which the processing of the tasks must be completed and the results of the performance of the tasks available for use by client 112 to provide a quality user experience. A component and/or associated tasks may be computationally intensive in that significant computing resources must be allotted to perform the tasks within certain time constraints for client 112 to provide a quality user experience. For example, client 112 may need to return results within a refresh rate (e.g., about 60 Hz, 90 Hz, or 120 Hz) of a display device being driven by client device 106, which requirement may be especially important to a quality user experience with a client that displays view in real time or near real time (e.g., a virtual reality or augmented reality client).

Service 110 may include any service provided by cloud server 102 and/or edge computing device 104 for access by client device 106 over network 108. Client 112 executing on client device 106 may request service 110 from cloud server 102 and/or edge computing device 104, such as by transmitting a request (e.g., a query, an instruction, etc.) to cloud server 102 and/or edge computing device 104. Service 110 may be associated with client 112 generally or with one or more components and/or associated tasks of client 112 specifically. For example, service 110 may include one or more components and/or tasks corresponding to one or more components and/or tasks for client 112. Service 110 may be of any scope, from a service that includes a single task of client 112, to a service that includes tasks associated with a single component of client 112, to a service that includes tasks associated with multiple, or even all components of client 112. Service 110 may include a virtual reality service, an augmented reality service, an artificial intelligence service, a computer vision image recognition service, a media content service, a content data streaming service, a data analytics service, a speech recognition service, a web service, a rendering service, a light mapping service, a texture mapping service, a 3D model computing service, a component-specific service, a task-specific service, and/or any other service that may be provided by cloud server 102 and/or edge computing device 104 for access by client device 106 over network 108. In certain examples, service 110 may include a virtual reality content streaming service that streams, from cloud server 102 and/or edge computing device 104, data representative of virtual reality content for rendering by client device 106. In certain other examples, service 110 may include an augmented reality object recognition service that analyzes video data and/or characteristics to identify objects represented in video captured by client device 106.

Cloud server 102 may include a system of one or more servers located in the cloud (at a cloud level of network 108) and configured to provide service 110 for access over network 108. For example, cloud server 102 may include one or more web servers configured to provide a web service for access by client device 106 over network 108.

Edge computing device 104 may include one or more servers (e.g., one or more servers configured in blade server format) and/or other computing devices physically located at an edge of network 108, nearer, in terms of latency, to client device 106 than cloud server 102 is to client device 106. Edge computing device 104 may be configured to provide service 110, or one or more components or tasks of service 110, for access over network 108. With edge computing device 104 located at an edge of network 108, data communication latencies between edge computing device 104 and client device 106 generally will be lower than data communication latencies between cloud server 102 and client device 106, which may allow edge computing device 104 to provide service 110, or one or more components or tasks of service 110, to client 112 more quickly than cloud server 102 may do so. In certain examples, edge computing device 104 may be configured to provide a latency-sensitive component or task of service 110 to client device 106 to leverage the lower latency for data communications between edge computing device 104 and client device 106.

The edge of network 108, as used herein, may include any location within network 108 that is nearer, in terms of latency, to client device 106 than cloud server 102 is to client device 106. In certain examples, the edge of network 108 may include a location at a base station or central office of a mobile wireless network at which edge computing device 104 (e.g., a mobile edge computing device) is implemented. Edge computing device 104 may be nearer than cloud server 102 to client device 106, in terms of latency, for one or more reasons. For instance, edge computing device 104 may be nearer to client device 106 in terms of geographical distance and/or network hops, which may cause latency of data communications between edge computing device 104 and client device 106 to be lower than latency of data communications between cloud server 102 and client device 106.

For example, in certain implementations, edge computing device 104 may be one hop or two hops away from client device 106, while cloud server 102 is a greater number of hops away from client device 106 such that latency of data communications between edge computing device 104 and client device 106 is lower than latency of data communications between cloud server 102 and client device 106.

System 100 may provide an end-to-end service delivery architecture configured to provide service 110 to client 112. To this end, cloud server 102 and edge computing device 104 may be configured to implement a unique, distributed data-processing architecture used to provide service 110 for access over network 108. As shown in FIG. 1, for example, cloud server 102 may implement a batch layer 114 and edge computing device may implement a speed layer 116 of a distributed data-processing architecture.

Batch layer 114 may be configured to manage and/or process on a complete master dataset, which dataset may be an immutable, append-only set of raw data is some implementations. Batch layer 114 may precompute on the dataset and generate batch views that may be requested by client device 106. In certain examples, batch layer 114 may be configured to precompute arbitrary query functions to generate the batch views. Batch layer 114 may be configured to maximize accuracy and completeness by processing all available data when generating views, which may allow batch layer 114 to fix errors by computing based on the complete dataset and updating existing views. Batch layer 114 may be configured to use a distributed processing system located within the cloud and capable of handling large quantities of data. Batch layer 114 may be configured to perform latency-tolerant manipulation of the dataset.

Speed layer 116 may be configured to process on a dataset (e.g., one or more data streams) in real time or near real time. To this end, speed layer 116 may use fast and incremental algorithms to process, with minimal latency, the most recent data to generate real-time views that may be requested by client device 106. Speed layer 116 may accommodate latency-sensitive requests, i.e., requests that are subject to low latency requirements. Speed layer 116 may be configured to minimize latency so that real-time views are made available almost immediately after data is received. By positioning speed layer 116 at edge computing device 104 at an edge of network 108 instead of at cloud server 102 with batch layer 114, speed layer 116 may receive data from client device 106 more quickly and make real-time views available to client device 106 more quickly than if speed layer 116 was implemented at a same network level as batch layer 114 (e.g., together with batch layer 114 in the cloud). In addition, in certain examples, speed layer 116 may facilitate input and/or output functions and logic that can exist off client device 106.

Batch layer 114 and speed layer 116 may be configured to manage and operate on distinct and matching datasets, such as dataset 118-1 and 118-2, respectively, as shown in FIG. 1. To this end, batch layer 114 and speed layer 116 may each maintain and process on a distinct dataset and may perform one or more operations to ensure that the datasets match each other. For example, batch layer 114 and/or speed layer 116 may be configured to exchange, by way of network 108, signals that may be used to synchronize the distinct datasets.

As an example, speed layer 116 may receive data from client 112 and may split the data in order to both process the data in accordance with operations of speed layer 116 and provide the data to batch layer 114 so that batch layer 114 may process the data in accordance with operations of batch layer 114. The processing performed on the data by speed layer 116 may result in a state of the dataset maintained by speed layer 116, and the processing of the data by batch layer 114 may result in a state of the dataset maintained by batch layer 114 that matches the state of the dataset maintained by speed layer 116, although the matching states will be processed on and/or generated at different times at least because of latency and processing time differences across speed layer 116 and batch layer 114. The distinct and matching datasets across batch layer 114 and speed layer 116 are processed at different points in time because batch layer 114 may receive its dataset slower than speed layer 116 receives its dataset and/or because batch layer 114 generally processes data slower than speed layer 116. Although the distinct and matching datasets across batch layer 114 and speed layer 116 may match at different points in time, the datasets may be referred to as synchronized or mirrored datasets.

Speed layer 116 may communicate any information to batch layer 114 that may be used by batch layer 114 to synchronize the distinct datasets. For example, speed layer 116 may inform batch layer 114 of operations being performed by speed layer 116 on its dataset. Batch layer 114 may similarly communicate any information to speed layer 116 that may be used by speed layer 116 to synchronize the distinct datasets. For example, batch layer 114 may provide data received at batch layer 114, data generated by batch layer 114, and/or information representative of processing performed by batch layer 114 to speed layer 116 for use by speed layer 116 to perform operations to synchronize its dataset with the dataset maintained by batch layer 114.

As another example, batch layer 114 and speed layer 116 may receive distinct and matching datasets from an external source for processing. To illustrate, in examples in which client 112 includes a virtual reality client, batch layer 114 and speed layer 116 may each receive a data stream (e.g., a virtual reality data stream) for processing. Speed layer 116 may process on its copy of the data stream to generate real-time views, and batch layer 114 may process on its copy of the data stream to generate batch views.

Batch layer 114 and speed layer 116 may provide generated views to a serving layer of the architecture, which serving layer may be implemented at edge computing device 104, cloud server 102, or both edge computing device 104 and cloud server 102. The serving layer may be configured to host and serve the views to client 112 over network 108. Thus, client 112 may request and access the generated views as needed from the serving layer of the architecture. Client 112 may include a compositing layer configured to combine views accessed from the serving layer to form a view that client device 106 may present to a user of client device 106.

Figure 2:
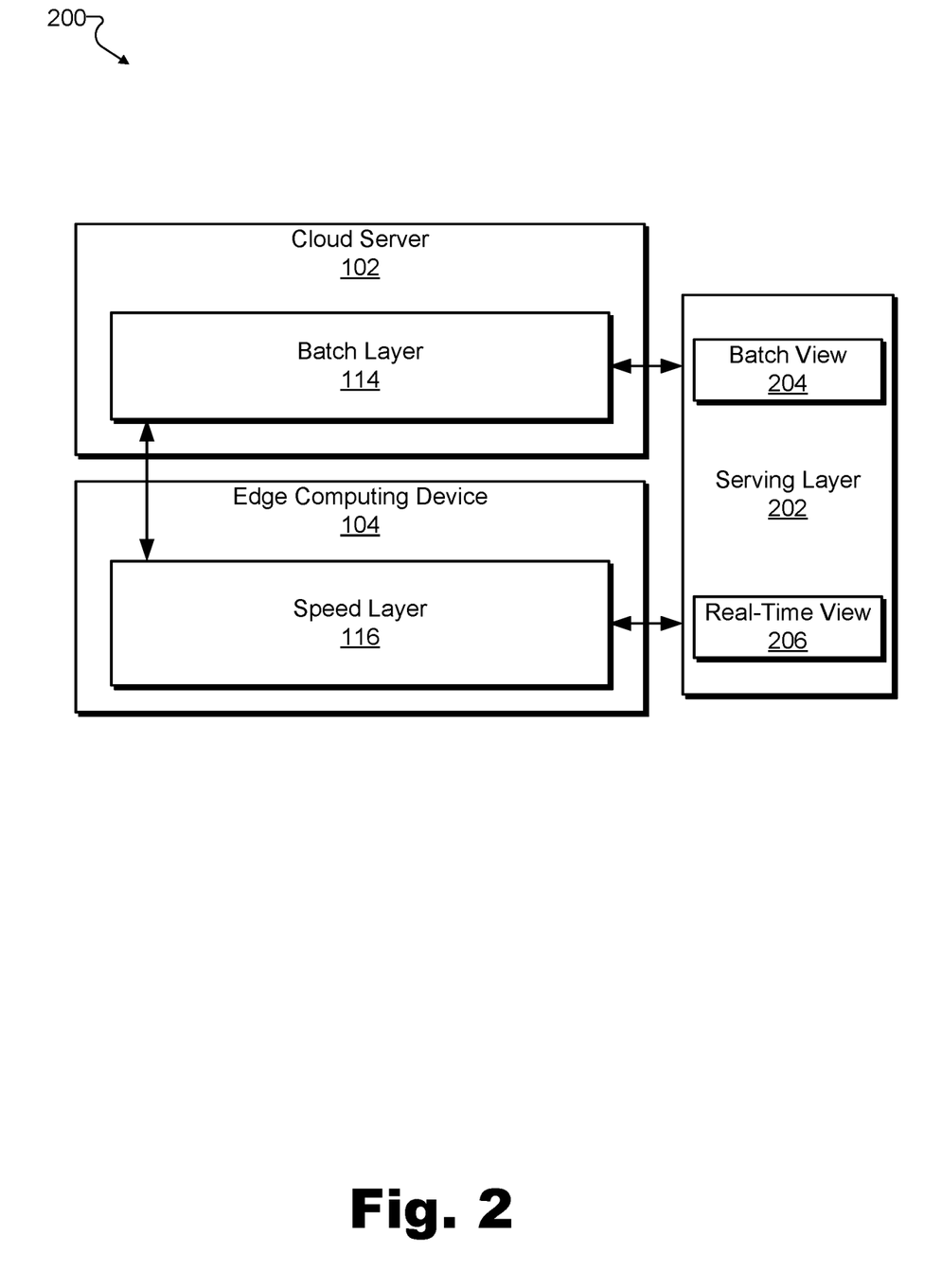
FIG. 2 illustrates an exemplary data-processing architecture according to principles described herein.

An exemplary architecture in which batch layer 114 is implemented by cloud server 102 (at a cloud network level) and speed layer 116 is implemented by edge computing device 104 (at an edge network level that is at a different network level than the cloud network level) will now be described. FIG. 2 illustrates an exemplary architecture 200 that includes batch layer 114, speed layer 116, and a serving layer 202 communicatively coupled one to another. Architecture 200, which may be referred to as a distributed data-processing architecture or a distributed service-delivery architecture, may be any suitable distributed data-processing architecture designed to handle massive quantities of data by implementing both batch-processing and speed-processing layers. In architecture 200, batch layer 114 and speed layer 116 may be implemented at different network levels, such as by implementing batch layer 114 in the cloud and speed layer 116 at an edge of network 108. For example, architecture 200 may be a modified lambda architecture in which batch layer 114 and speed layer 116 are implemented at different network levels, such as a modified lambda architecture in which speed layer 116 is implemented at an edge of network 108 (e.g., at edge computing device 104) instead of in the cloud (e.g., at cloud server 102) with batch layer 114, such as described herein.

Serving layer 202 may be implemented in the cloud (e.g., at cloud server 102), at the edge of the network (e.g., at edge computing device 104), distributed across the cloud and the edge of the network, or at any other suitable network location or level accessible by client device 106. Serving layer 202 may receive and host views generated by batch layer 114 and speed layer 116, such as a batch view 204 generated by and received from batch layer 114 and a real-time view 206 generated by and received from speed layer 116. Serving layer 202 may receive requests (e.g., queries) from client device 106 by way of network 108 and provide views, such as batch view 204 and/or real-time view 206, to client device 106 in response to the requests. Serving layer 202 may include or utilize any suitable data storage (e.g., database) and serving technologies for hosting and providing views to client device 106 and for determining which views to provide to client device 106.

A view hosted by serving layer 202 may include any set of data generated by batch layer 114 or speed layer 116. A view may be in any suitable format, such as a map, a page, an image, or a sub-interface that allows client 112 to obtain a state of client 112, such as a state of a world associated with client 112. As an example, in implementations in which client 112 includes a virtual reality client, a view generated by batch layer 114 or speed layer 116 may include data representative of a view (e.g., a perspective view) of a virtual reality world from a particular vantage point associated with client 112. As another example, in implementations in which client 112 includes an augmented reality client, a view generated by batch layer 114 or speed layer 116 may include data representative of a view of a virtual object to be displayed together with a live video camera view captured and displayed by client device 106.

Figure 3:
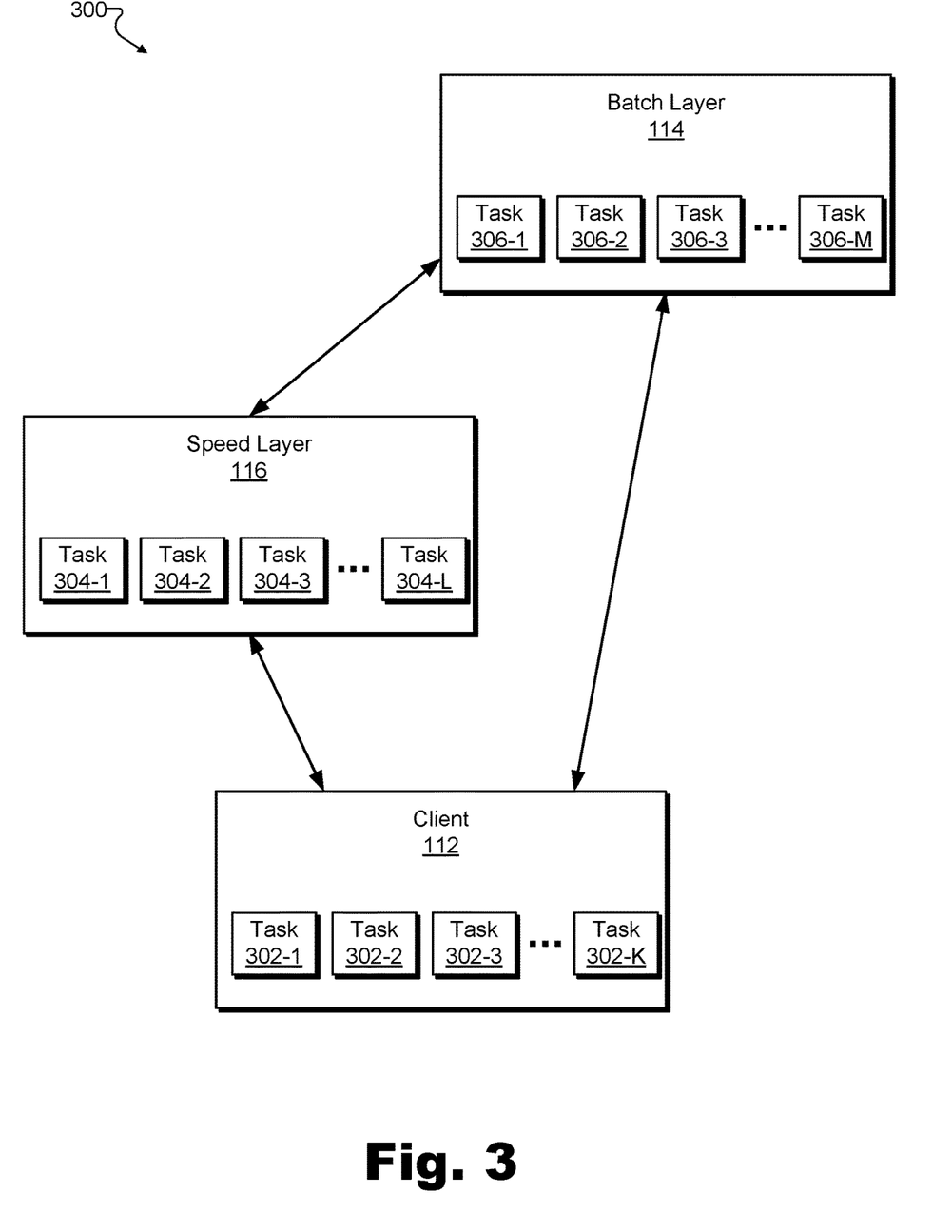
FIG. 3 illustrates an exemplary configuration of computing tasks of a client, a speed layer, and a batch layer according to principles described herein.

Client 112, speed layer 116, and/or batch layer 114 may include sets of individual computing tasks that may be performed by client 112, speed layer 116, and/or batch layer 114, respectively. FIG. 3 illustrates an exemplary configuration 300 in which client 112 is configured to selectively perform computing tasks selected from a set of defined tasks 302 (e.g., tasks 302-1 through 302-K), speed layer 116 is configured to selectively perform computing tasks selected from a set of defined tasks 304 (e.g., tasks 304-1 through 304-L), and batch layer 114 is configured to selectively perform computing tasks selected from a set of defined tasks 306 (e.g., tasks 306-1 through 302-M).

The different sets of tasks in configuration 300 may correspond one to another in any suitable way. As an example, certain tasks included in the set of tasks 302 implemented by client 112 may also be included in the set of tasks 304 implemented by speed layer 116 and/or in the set of tasks 306 implemented by batch layer 114. Accordingly, client 112 may selectively and/or dynamically choose to perform certain tasks included in the set of tasks 302 and offload other tasks included in the set of tasks 302 for performance by speed layer 116 or batch layer 114. As another example, tasks included in the set of tasks 304 implemented by speed layer 116 may also be included in the set of tasks 306 implemented by batch layer 114. Accordingly, speed layer 116 may selectively and/or dynamically choose to perform certain tasks included in the set of tasks 304 and offload other tasks included in the set of tasks 304 for performance by batch layer 114. Examples of client 112 and speed layer 116 selectively and dynamically choosing which tasks to perform and which tasks to offload are described herein.

The computing tasks may be modular and individually executable. The individually executable tasks may be executed in parallel, which may allow different threads to be processed in parallel. For example, client 112 may be able to run a rendering thread and a network thread concurrently by executing appropriate individual tasks in parallel. Client 112 may execute tasks without first having complete information (e.g., without a complete dataset) and without regard to where the tasks are being executed (e.g., without regard to whether a task is being executed by client 112 or by speed layer 116). Thus, client 112 does not need to receive all information before processing and does not require pre-compilation before processing. A task may be configured to wait for output from another task before completing execution, without client 112 having to direct the wait or otherwise control the timing of execution of the task.

Speed layer 116 and/or batch layer 114 may be similarly configured to execute modular computing tasks individually and in parallel. Speed layer 116 and/or batch layer 114 may be configured to distribute tasks and/or performance of tasks horizontally across multiple devices at a common network level. For example, speed layer 116 may distribute performance of tasks included in set of tasks 304 across multiple devices (e.g., across multiple central processing units (CPUs), graphics processing units (GPUs), network processors (NPUs), blade servers, nodes, etc.) located at the edge of network 108.

Computing tasks may be configured to have any suitable level of granularity to support modular, individual, and parallel execution. In certain examples, tasks may be implemented as granular microservices, which may be implemented as micro-applications that perform specialized functions quickly. For instance, a microservice may be configured to perform specific mathematical calculations quickly. In some examples, certain microservices may be implemented as granular micro-kernels that perform specialized functions very quickly. Such a micro-kernel may implement a near-minimum amount of computing code (e.g., software) to perform a very specific function and may allow direct or near-direct interaction with hardware (e.g., a CPU, a GPU, an NPU, etc.). In certain examples, quick-access micro-kernels may be configured for GPU rendering, computer vision, and/or large-scale mathematic computation.

In certain examples, computing tasks may be mapped to components of client 112 and/or service 110. For example, a subset of the tasks implemented by client 112 may be mapped to a component of client 112 and/or service 110. When the component is requested by client 112, client 112 may identify and perform the tasks mapped to the requested component. Client 112 may perform one or more of the tasks locally using resources of client device 106 and/or offload one or more of the tasks to speed layer 116 at the edge of network 108 or batch layer 114 in the cloud. Examples of components of client 112 and/or service 110 may include, without limitation, a rendering component, an artificial intelligence component, a video image object recognition component, an augmented reality component, a network communication component, a speech recognition component, etc.

With functionality of client 112, speed layer 116, and/or batch layer 114 implemented as modular, individually executable tasks (e.g., as microservices and/or micro-kernels), system 100 may provide significant flexibility and speed for processing high-throughput data. In addition, the implementation may enable certain optimizations that may improve service 110, client 112, and/or a user experience with client 112. Examples of such optimizations are described herein.

In certain implementations, components and/or tasks of client 112 or service 110 may be designated to be processed in certain ways within system 100. For example, a component or a task may be designated to be processed by client 112 at client device 106, by speed layer 116, or by batch layer 114. Client 112, speed layer 116, and batch layer 114 may be configured to identify such a designation and process the component or task accordingly. If the component or task is designated to be processed by client 112, client 112 may direct execution of the component or task to be performed at client device 106. If the component or task is designated to be processed by speed layer 116, client 112 may request execution of the component or task by speed layer 116, such as by sending requests to edge computing device 104 over network 108. If the component or task is designated to be processed by batch layer 114, client 112 may request execution of the component or task by batch layer 114, such as by sending requests to cloud server 102 over network 108.

In certain examples, a component or a task may be designated to be processed in a way to be determined at runtime. For such a designation, client 112, speed layer 116, and/or batch layer 114 may determine, at runtime, how to process the component or task. For instance, client 112 may determine, at runtime, whether to process the component or task at client device 106 or to request that the component or task be processed by speed layer 116.

Designation of a component or task may be made in any suitable way. For example, client 112, speed layer 116, and/or batch layer 114 may be configured to designate components or tasks based on behavior. For example, a rendering component may be designated for processing by speed layer 116, and a voice chat component may be designated for processing by batch layer 114. In some implementations, certain latency-sensitive components or tasks of client 112 or service 110 (e.g., components or tasks requiring responses faster than about twenty milliseconds) may be designated for processing by speed layer 116, and more latency-tolerant components or tasks of client 112 or service 110 may be designated for processing by batch layer 114. In certain implementations, for example, client 112, speed layer 116, and batch layer 114 may be configured to designate components such as a rendering component, a computer vision component, and an artificial intelligence component for processing by speed layer 116 and components such as an e-commerce component, a log component, and a data analytics component for processing by batch layer 114.

As mentioned, in certain implementations, system 100 may be configured to determine at runtime (e.g., in response to a request that the component or task be performed) how a component or a task will be processed. Such a determination may be made in view of a designation of the component or task or regardless of a designation of the component or task. An element of system 100 may be configured to make the determination based on predefined factors that are designed to facilitate the component or task being assigned to the best available resource for processing (e.g., in order to facilitate optimization of service 110 and/or client 112, promote efficient use of resources, and/or provide a quality and/or improved user experience with service 110 or client 112). The element of system 100 may be configured to receive and analyze information about the predefined factors, and to determine how the component or task will be processed. The predefined factors may include, without limitation, current, recent, and/or historical latencies of data communications with client device 106 (e.g., tracked latencies between client device 106 and edge computing device 104 or cloud server 102), conditions of network connections, statuses of resources at client device 106 (e.g., current usage, load, capabilities, and/or availability of resources of client device 106) such as a GPU at client device 106, statuses of resources at speed layer 116, latencies of processing and/or internal data communications within client device 106 (e.g., latency to send a task to a GPU of client device 106), temperatures of components of client device 106, statuses of other tasks assigned or being assigned for processing by elements of system 100, any other suitable factors, or any combination or sub-combination of such factors.

As an example, during operation of client 112, client 112 may call for a task to be executed. Client 112 may determine that current latencies between client device 106 and edge computing device 104 are below a defined threshold and, in response, may offload performance of the task by requesting that the task be performed by speed layer 116 (e.g., by sending a task performance request to edge computing device 104). In certain examples, the defined threshold may correspond to a latency to send the task to a resource (e.g., a GPU) at client device 106, and client 112 may determine that when the latency to send the task to speed layer 116 is not greater than the latency to send the task to a resource at client device 106, client 112 will request that the task be performed by speed layer 116 instead of at client device 106. As another example, client 112 may determine to send a task to speed layer 116 based on a status of resources of client device 106, such as when usage of resources of client device 106 has reached a defined threshold (e.g., when a temperature of a component of client device 106 has reached a defined threshold temperature). As another example, client 112 may determine to process a task at the client device 106 because of a current network condition (e.g., current latency is greater than a defined threshold, a connection was temporarily interrupted, etc.). In this or a similar manner, client 112 may dynamically select an optimal path for a component or a task to be performed based on current latencies and/or other factors. Speed layer 116 may be similarly configured to determine, at runtime, whether a component or a task will be processed by speed layer 116 or offloaded (e.g., to batch layer 114) based on one or more predefined factors.

To illustrate one example, with client 112 running on client device 106, a user of client device 106 may point a video camera of client device 106 to capture video of a scene that includes a building. Client 112 may perform video recognition operations, which may include breaking a frame of video camera input into an array of features and sending those features to speed layer 116. If speed layer 116 has enough information on the edge of network 108 to do feature recognition, speed layer 116 will do feature recognition and send results to client 112 (e.g., results identifying the building). Alternatively, speed layer 116 may offload feature recognition processing to batch layer 114 in the cloud. While the offloaded feature recognition processes are being executed at speed layer 116 or batch layer 114, client 112 may continue with other processing, such as rendering, doing a base feature analysis to identify features in frames, and retrieving virtual objects for display to augment captured video camera frames. This may include client 112 retrieving a model of a virtual object in low quality from speed layer 116 and starting to render the model of the virtual object while speed layer 116 obtains higher-quality graphical assets (e.g., textures, lighting information from the camera feed, etc.) and renders and prepares to send the higher-quality graphical assets (e.g., beautiful light maps) to client 112.

By intelligently and dynamically determining how to assign processing of components and tasks based on predefined factors, elements of system 100 may adjust how components and tasks are performed on demand and in a manner that may facilitate efficient use of resources and/or an improved user experience. Thus, elements of system 100 may determine best resources (e.g., best paths and best processor slicing per GPU) from task to task on an as needed basis, instead of being preprogrammed. This may provide potentially unlimited ability to process components and tasks at least because processing of the components and tasks may be divided up across the network in an intelligent and meaningful way that facilitates efficient use of resources and/or an improved user experience with service 100 or client 112. In certain examples, dynamic assignment of task processing may facilitate specific optimizations of service 110, such as improved quality of graphics being delivered to client 112, for example.

Because of low latency of data communications between client 112 implemented at client device 106 and speed layer 116 located at the edge of network 108, specific latency-sensitive and/or computationally intensive components or tasks of client 112 may be offloaded from client device 106 to speed layer 116 that could not be offloaded previously in conventional data-processing architectures. The offloaded tasks may be executed using shared, accelerated microservices of speed layer 116 at the edge of network 108, at acceptable latencies. In addition, hardware-based encoding and decoding processes on client 112 and at speed layer 116 at the edge of network 108 may enable high-speed and/or low-latency offloading such as loading data into flat buffers and streaming the flat buffer data through a compression codec such as an H.264 or H.265 codec.

Thus, components and tasks of client 112 that have certain latency sensitivities may be offloaded to speed layer 116, while other components and tasks (e.g., components and tasks having even more stringent latency sensitivities) may be performed locally at client device 106. In certain implementations, for example, certain latency-sensitive components or tasks of client 112 or service 110 such as components or tasks requiring responses between about five and twenty milliseconds may be designated for processing by speed layer 116, and more latency-tolerant components or tasks of client 112 or service 110 such as components or tasks requiring responses faster than about five milliseconds may be designated for processing on client device 106. These ranges may be adjusted as may fit a particular implementation and/or configuration. For instance, in a configuration in which latencies of about one millisecond are provided between edge computing device 104 and client device 106, components or tasks requiring responses between about one and twenty milliseconds may be designated for processing by speed layer 116.

In certain implementations, computing components and/or tasks that may be offloaded to speed layer 116 may include, without limitation, distributed rendering, certain components or tasks of distributed rendering such as light map and/or light field tasks (calculating and providing a light field), computer vision such as image and object recognition and/or tracking tasks, state management such as state management of a virtual reality world (e.g., state management of rooms and/or users of a virtual reality world), procedural generation of assets such as virtual reality assets, world caching such as virtual reality world caching, screen space processing components or tasks such as calculations related to determining field of view in a virtual reality world, indirect lighting components or tasks such as ray tracing operations, physics processing components or tasks such as fluid dynamics operations, any other suitable components or tasks of an application executing on client device, or any combination or sub-combination of such components and/or tasks.

In certain implementations, elements of system 100 may be configured to perform optimizations associated with predicting and caching operations that may improve a quality of experience with service 100 or client 112. For example, client 112 and/or speed layer 116 may be configured to scale up prediction and loading of views in advance because of low-latency communications between client device 106 and edge computing device 104. This may allow client 112 and/or speed layer 116 to cache more data (e.g., more graphics data and/or higher quality graphics data) further in advance and/or to run faster such that more data is available to speed layer 116 and/or client 112 for quick-access processing.

To illustrate, in an example involving virtual reality content, client 112 includes a virtual reality client having a rendering component, client 112 and/or speed layer 116 may be configured to use data about a vantage point in a virtual world to predict where the vantage point will be located in the future. For instance, velocity of the vantage point may be used to predict where the vantage point will be a few milliseconds or seconds in the future. Client 112 and/or speed layer 116 may use predicted locations of the vantage point to generate and cache views in advance such that the views are available for quick-access by client 112 as needed. Such views may be used by client 112 and/or speed layer 116 to minimize or avoid interruptions to continuous presentation of the virtual world (e.g., such as may otherwise occur if a network connection is temporarily interrupted), which interruptions may adversely affect the user experience with the virtual reality client. In certain examples, if continuous presentation of the virtual world is to be interrupted for a period of time that extends beyond the cached frames, client 112 and/or speed layer 116 may be configured to re-project one or more previous frames based on predicted movement (e.g., of the vantage point) to generate frames that may be presented instead of the virtual world have a severe interruption like coming to a halt or crashing.

In certain examples, prediction may be performed in tandem at both a server level of network 108 (e.g., in the cloud or at the edge of network 108) and at a client level of network 108 (e.g., at client device 106). Server-level prediction may be relevant when synchronizing multiple users interacting in the same virtual world, for example. For instance, if interactions of a user with the virtual world are interrupted for some reason, speed layer 116 may use prediction and caching to prevent or minimize any degradation to the experiences of other users interacting with the virtual world. If the users are racing virtual vehicles in a virtual world, for example, and connection to one user is interrupted, speed layer 116 may use prediction and caching to continue to render the vehicle of the user in a predicted manner for a short period of time until the connection is reestablished.

Client-level prediction may be relevant when client 112 loses connection to the server (e.g., to cloud server 102 and/or edge computing device 104). In such a situation, client 112 may use prediction and caching to continue to render a high-quality experience for the user and avoiding a jarring experience such as the virtual world coming to a halt or crashing.

In certain examples, elements of system 100 may be configured to perform heuristic-based caching over time to improve caching based on historical patterns and preferences of users interacting with system 100. For example, if many requests are received from a particular geographic area, elements of system 100 may scale up caching operations for that area.

In certain examples, elements of system 100 may be configured to provide a graceful falloff procedure in a way that leverages architecture 200. In a virtual reality example, for instance, interaction with a virtual world may be interrupted to an extent that a graceful falloff procedure will be performed. For example, if a lost network connection is not reestablished quickly enough, elements of system 100 may perform a defined graceful falloff procedure that is natural within the world and avoids an unnatural, abrupt, or jarring interruption from occurring in the world. In the graceful falloff procedure, the quality of the experience may degrade because data available for prediction will fade away after user interaction stops, but the virtual world may be prevented from coming to an abrupt halt or crashing. In the example of vehicles racing in a virtual world, for example, if the connection of a user to network 108 is lost and not reestablished quickly enough, a graceful falloff procedure may be applied to the vehicle of the user, such as by gradually slowing the vehicle to a stop as if the vehicle had become disabled. As another example, if a connection to the edge of network 108 is lost or the network connection starts degrading such that latency increases, processing of rendering tasks may be gracefully offloaded from speed layer 116 to client 112. The quality of the images may degrade, but there will still be images presented. As another example, if client device 106 starts to overheat, client 112 may gracefully turn off components or offload components to speed layer 116 and/or batch layer 114. For instance, if all ray-tracing is being performed on client device 106 and client device 106 starts heating up, client 112 may offload ray-tracing to speed layer 116 and/or batch layer 114. One of more of the above-described graceful falloff procedures may benefit from architecture 200, such as by being able to offload specific and/or more tasks to edge computing device 104 and/or by being able to predict and cache data further ahead such that more data is available for graceful falloff and/or recovery from a network interruption.

In certain examples, elements of system 100 may be configured to perform operations to enable adaptive rendering in which different quality levels of graphics may be rendered at different times to facilitate a quality user experience with service 110 or client 112. For example, client 112 and/or speed layer 116 may be configured to quickly render lower-quality graphics first and then scale up to higher-quality graphics as calculations become available. To illustrate, a user controlling an avatar in a first-person virtual reality experience may direct the avatar to open a door to a room to reveal a new scene to the avatar. Client 112 and/or speed layer 116 may quickly render lower-quality graphics of the room first and then scale up the graphics. This may allow the user to see a view of the room immediately instead of waiting for higher-quality graphics to become available. In certain implementations, speed layer 116 may provide a close-by cache of graphics at the edge of network 108 to allow fast rendering of a view at low quality while higher-quality models are computed and/or retrieved.

As another example, client 112 and/or speed layer 116 may degrade quality of graphics being presented in order to allow the virtual reality world to continue without crashing. For instance, a connection to speed layer 116 may be lost or degraded, and rendering may be offloaded to client 112, which may render lower-quality graphics than speed layer 116.

To facilitate adaptive rendering, client 112 and/or speed layer 116 may cache different quality levels of graphics for a virtual world such that the various graphics are available for use by client 112 and/or speed layer 116 as needed to support scaling up or down as required. With respect to rendering different quality levels of graphics, speed layer 116 may be configured to fail up a level to the cloud (to batch layer 114) or down a level to client device 106.

In certain examples, system 100 may provide a virtual reality streaming architecture that supports end-to-end streaming delivery of virtual reality content on demand and/or in real time (e.g., without having to download data for an entire virtual reality world in advance of rendering). The architecture may enable one or more of the exemplary optimizations described herein, as well as additional or alternative optimizations that may improve a virtual reality experience.

In certain implementations, speed layer 116 may provide distributed resources (e.g., GPUs) at strategic locations, which may provide a shared, resource accelerated (e.g., a GPU accelerated) compute platform that can be provided as a service, such as a software as a service (SaaS), an infrastructure as a service (IaaS), and/or a platform as a service (PaaS) model. To this end, speed layer 116 may be implemented to include scripts (e.g., Python script) with engine logic for performing one or more of the speed layer operations described herein. Speed layer 116 may include or access one or more resources such as GPUs located at the edge of network 108. In certain examples, speed layer 116 may implement a software layer (e.g., CUDA provided by NVIDIA Corporation) that provides direct access to a GPU's virtual instruction set and parallel computing elements for execution of compute kernels.

In certain examples, client 112 may initiate access to the architecture of system 100 by initiating communications with and authenticating to batch layer 114, which may perform of one or more authorization and access management tasks for this purpose. Batch layer 114 may assign client 112 to a particular speed layer and/or edge computing device, such as speed layer 116 implemented by edge computing device 104, that is located proximate to client device 106. Batch layer 114 may inform client 112 of the assignment, and client 112 may being communicating with the assigned speed layer. Client 112 may offload tasks to the assigned speed layer and/or to batch layer in any of the ways described herein. The speed layer may include a server configured to receive requests from client 112, such as a server (e.g., a NODE JAVASCRIPT server) for receiving HTTP requests. Client 112 may also send requests for views to serving layer 202, which will determine which speed views and/or batch views to provide to client 112 in response to the requests. Client 112 may use a compositing layer to combine speed and batch views to produce a view for presentation to the user of client device 106.

Figure 4:
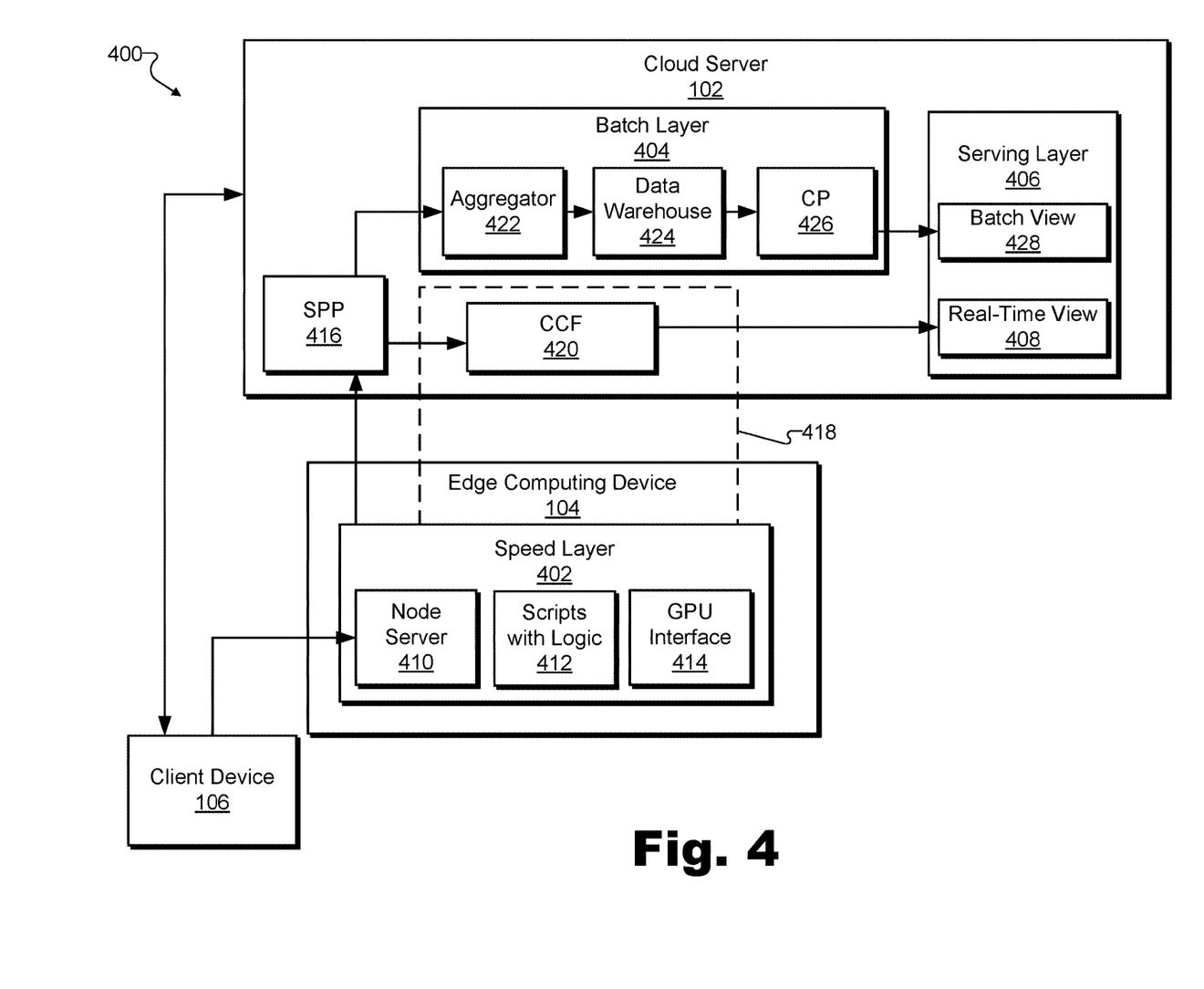
FIG. 4 illustrates an exemplary implementation of an edge compute system according to principles described herein.

FIG. 4 illustrates an exemplary implementation 400 of an edge compute system according to principles described herein. Implementation 400 may be configured to provide a virtual reality service and/or application in certain examples described herein and/or to provide any other suitable service and/or application in other examples.

As shown, implementation 400 may include cloud server 102, edge computing device 104, and client device 106 communicatively coupled one to another. Cloud server 102, edge computing device 104, and client device 106 may be configured to provide an architecture for delivery of a service to client device 106. Edge computing device may implement a speed layer 402 of the architecture, and cloud server 102 may implement a batch layer 404 and a serving layer 406 of the architecture. Cloud server 102 may be implemented using any suitable web services platform such as AMAZON WEB SERVICES ("AWS").

Client device 106 may execute a client, such as client 112, and, after authenticating to cloud server 102 and receiving information about speed layer 402 from cloud server 102, send requests to cloud server 102 and edge computing device 104 in associated with execution of the client. Client device 106 may receive responses to the requests (e.g., responses including data and/or views) and process the responses to provide a service and/or user experience with the client to a user of client device 106.

For a rendering component of the client, client device 106 may send communications to speed layer 402 at edge computing device 104 for use by speed layer 402 to generate real-time views, such as real-time view 408, of a virtual reality world. For example, client device 106 may send information about a vantage point of a user of client device 106 and changes to the vantage point as the user navigates within the virtual reality world.

Speed layer 402 may include a node server 410 configured to receive communications from client device 106 and to process the communications. In certain examples, node server 410 may include a run-time environment for executing code server-side, such as a NODE.JS JAVASCRIPT runtime environment.

Speed layer 402 may also include scripts with logic 412 that may be performed to execute on the data received by node server 410. For example, scripts with logic 412 may include a set of microservices (e.g., a set of micro-kernels) such as described herein.

Speed layer 402 may also include a GPU interface 414 that provides access to GPU resources located at the edge of the network, such as GPU resources (not shown) implemented by edge computing device 104. In certain examples, GPU interface 414 may include multiple instances of CUDA by NVIDIA, which may provide a parallel computing platform and application programming interface models that allow access to CUDA-enabled GPUs. The CUDA platform may be implemented as a software layer that gives direct access to a GPU's virtual instruction set and parallel computational elements, for the execution of compute kernels, such as the micro-kernels described herein.

The exemplary components of speed layer 402 shown in FIG. 4 may process data in real-time and near real-time to provide real-time views very quickly, which real-time views may be provided to serving layer 406.

Speed layer 402 may also split data received from client device 106 and provide a copy of the received data, as well as any other information about operation of speed layer 402, to cloud server 102 for use by batch layer 404. For example, speed layer 402 may provide data received from client device 106 to a stream processing platform ("SPP") 416 implemented by cloud server 102. SPP 416 may provide a high-throughput, low-latency platform for processing real-time data feeds. In certain examples, SPP 416 may be implemented using APACHE KAFKA.

A dashed line 418 extending from speed layer 402 to cloud server 102 represents an interface of speed layer 402 with cloud server 102, which interface may be used to exchange data between speed layer 402 and batch layer 404. In such an implementation, cloud server 102 may include a cluster computing framework ("CCF") 420, which may be configured to process large amounts of streaming data quickly. CCF 420 may be configured to split the compute of large amounts of data among servers by using suitable clustering processes to act on the servers as one server. CCF 420 may treat speed layer 402 as a cluster. CCF 420 may perform processing to stream real-time views generated by speed layer 402 to serving layer 406 when serving layer 406 is implemented in the cloud as in implementation 400. In certain examples, CCF 420 may be implemented using any suitable cluster-computing framework solution. Real-time views generated by speed layer 402 may be provided to serving layer 406 through SPP 416 and/or CCF 420 in certain examples, or provided to serving layer 406 by way of other paths in other examples.

Certain data received and processed by SPP 416 may be provided to batch layer 404 for batch processing. As shown, batch layer 404 may include an aggregator 422, a data warehouse 424, and a cluster platform ("CP") 426, which may be configured to perform one or more of the batch layer operations described herein, including generating batch views for access by client device 106.

Aggregator 422 may be configured to aggregate large masses of streaming data being received, and classify and/or perform more or more other processes on the data. In certain examples, aggregator 422 may be implemented using any suitable service solution for collecting, aggregating, and moving large amount of data (e.g., streaming data flows).

Data warehouse 424 may store data and/or metadata associated with a service being provided by cloud server 102. For example, data warehouse may store data and/or metadata that describes virtual object assets, such as virtual objects associated with a virtual reality world. In certain examples, data warehouse 424 may be implemented using any suitable web service data storage solution.

CP 426 may be configured to perform processing to generate and provide batch views, such as a batch view 428, to serving layer 406. In certain examples, CP 426 may be implemented using any suitable managed cluster platform solution that processes and analyzes vast amount of data.

Serving layer 406 may receive and index batch views generated by batch layer 404 and real-time views generated by speed layer 402. Serving layer 406 may be configured to receive requests for views from client device 406, and identify and provide selected views to client device 106 in response to the request.

Figure 5:
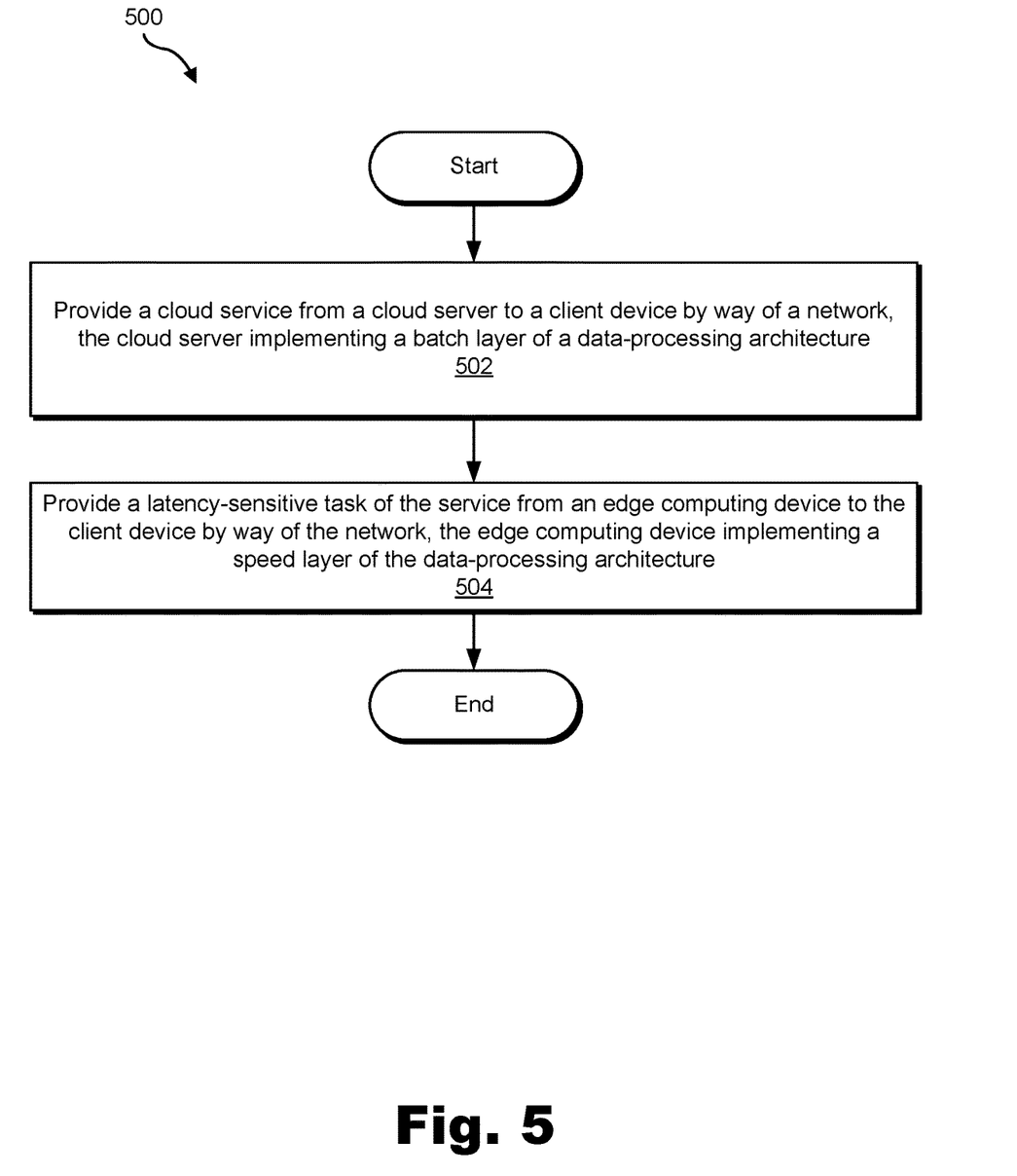
FIG. 5 illustrates an exemplary edge compute method according to principles described herein.

FIG. 5 illustrates an exemplary edge compute method 500. While FIG. 5 illustrates exemplary operations according to one embodiment, other embodiments may omit, add to, reorder, and/or modify any of the operations shown in FIG. 5. One or more of the operations shown in FIG. 5 may be performed by system 100 and/or any component(s) or implementation(s) thereof.

In operation 502, a cloud service is provided from a cloud server to a client device by way of a network. Operation 502 may be performed by the cloud server, such as by cloud server 102 and/or batch layer 114 implemented by cloud server 102. Operation 502 may be performed in any of the ways described herein.

In operation 504, a latency-sensitive task of the service is provided from an edge computing device to the client device by way of the network. Operation 504 may be performed by the edge computing device, such as by edge computing device 104 and/or speed layer 116 implemented by edge computing device 104. Operation 504 may be performed in any of the ways described herein, including in response to a request from client 112 to offload the latency-sensitive task of the service from client device 106 to speed layer 116 at the edge of network 108.

While certain examples described herein have been described in terms of a single client and client device accessing services, components, and tasks from cloud server 102 and/or edge computing device 104, this is illustrative only. In certain implementations, multiple clients implemented on respective client devices may concurrently access services, components, and tasks from cloud server 102 and/or edge computing device 104, including components and tasks provided by speed layer 116 as a service. In such implementations, a one-to-one relationship between a distinct data-processing architecture and a client is not required and scaling is not limited to linear scaling. Rather, systems and methods described herein may provide services, components, and tasks as a service in a manner that supports a one-to-many relationship and allows scaling that is more economical that linear scaling.

In certain implementations, systems and methods described herein may be used to provide a streaming virtual reality service to end uses of the service. This may include streaming virtual reality data representative of one or more persistent 3D virtual reality worlds, which streamed data may be fundamentally different from virtual reality data representative of other types of conventional virtual reality worlds in various ways. For example, conventional technologies stream virtual reality worlds by virtualizing hardware and software needed to process and render the virtual reality worlds. As such, when a conventional service provides a streaming virtual reality world to a user using this virtualization paradigm, there may be a virtualization of hardware and software of a virtual reality presentation system (e.g., a gaming PC loaded with software representative of the virtual reality world) that exists within the cloud (i.e., exists on one or more servers with which a client device used by the user is communicating by way of a network). The virtualized system may be dedicated to providing a virtual reality world to a particular user and may thus correspond to the client device used by the user in a one-to-one fashion. For example, user inputs may be communicated from the client device to the cloud-based virtualization system, and a video stream may be communicated from the virtualization system back down to the client device.

As a result, users experiencing a virtual reality world by way of this conventional paradigm may be assigned such cloud-based virtualizations of virtual reality presentations systems, and each system may provide a respective user with virtual reality content in essentially the same way that a system would if it were localized to the user, rather than in the cloud. For example, even though a particular user may receive virtual reality data in a stream (e.g., from the cloud) rather than from a local virtual reality presentation system (e.g., a gaming PC owned by the particular user), the software running on the respective virtualized system assigned to the particular user must be compiled, built, and distributed to be run and used by the user. Consequently, just as with non-streamed virtual reality data that is processed and rendered locally, changing aspects of virtual reality data streamed in this conventional way (e.g., aspects such as the presence, behavior, functionality, appearance, etc., of objects within the virtual reality world) may require recompilation, rebuilding, and redistribution of the virtual reality data loaded onto the virtualized system. At the very least, a software patch or the like would need to be distributed and installed by each virtualized system streaming the conventional virtual reality world.

In contrast, virtual reality data representative of persistent 3D virtual reality worlds may operate using a one-to-many stateful paradigm that is fundamentally different from the one-to-one paradigm described above. Rather than loading software representative of the virtual reality world onto dedicated, one-to-one virtualizations of virtual reality presentation systems as described above, a single system maintaining a world state of a persistent 3D virtual reality world (e.g., data representative of which objects are within the world, where the objects are disposed within the world, how the objects are moving and/or interacting within the world, etc.) may deliver the same state information to many different clients (e.g., client devices of different users) that may perform the processing and rendering on their own and/or by offloading certain components or tasks to edge servers relatively proximate to the clients as latency limitations may allow. Accordingly, virtual reality data representative of a persistent 3D virtual reality world may be broadcast or multicast to many client devices simultaneously to allow many users to jointly experience the persistent 3D virtual reality world while only one instance of the world is maintained (e.g., rather than many different instances of the world being maintained on individual virtualized systems, as described above). Additionally, as these persistent 3D virtual reality worlds are continuously streamed, all aspects of the appearance and functionality of the persistent 3D virtual reality worlds and components therein may be modular, open, dynamic, and modifiable at run time.

As such, one benefit of persistent 3D virtual reality worlds (e.g., virtual reality worlds streamed using a stateful, one-to-many paradigm such as described above) is that 3D virtual reality worlds may be dynamically changed (e.g., on demand, at run time as the virtual reality data is streaming) in various ways without the virtual reality data representative of persistent 3D virtual reality worlds being recompiled, rebuilt, or even updated by way of a software patch or the like. For example, as the virtual reality data of persistent 3D virtual reality worlds is streaming, a provider of the virtual reality data may be able to freely add or remove objects from the worlds, add games that may be played by users, update or adjust the code on which the world is running (e.g., to add new features or functionality, to fix bugs, etc.), change the functionality of the worlds (e.g., modify the physics of the worlds, etc.), and/or otherwise dynamically contextualize the worlds in any suitable way.

Another benefit of persistent 3D virtual reality worlds is that virtual reality data of such worlds may be broadcast to many users at once without requiring dedicated virtualizations of hardware and software to be assigned and reserved for all of the users. In some examples, various different persistent 3D virtual reality worlds offered by a provider may be broadcast to a subscriber base of many users as virtual reality experience options. As such, users in the subscriber base may instantly switch from world to world in an analogous way as users may switch through different television channels. Like television channels, various 3D virtual reality worlds may persistently exist and be persistently provided to users as options to experience regardless of which worlds (if any) the users actually select and experience. Also analogous to television channel surfing, client devices used to instantly switch from world to world in this way may not store or receive any data related to the different persistent 3D virtual reality worlds prior to presenting the worlds to respective users. All the data needed to process, render, and present a particular persistent 3D virtual reality world to the user may be provided at run time when the world is selected.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor, a CPU, a GPU, etc.) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
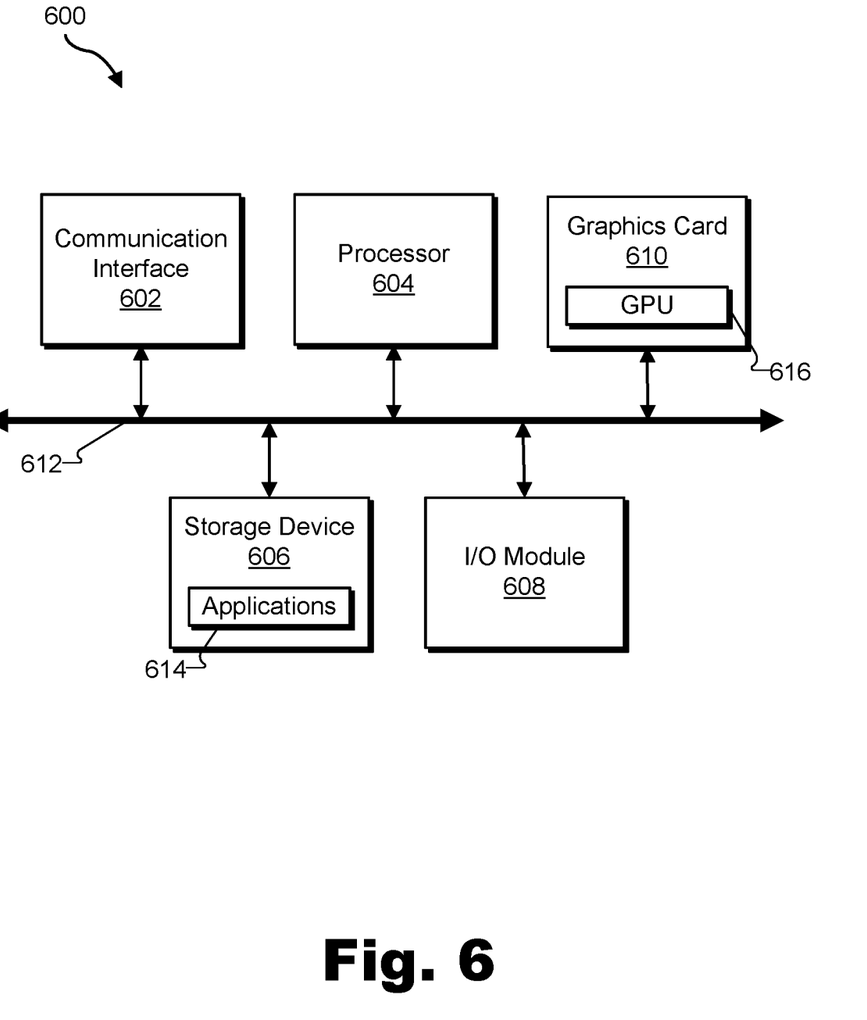
FIG. 6 illustrates an exemplary computing device according to principles described herein.

FIG. 6 illustrates an exemplary computing device 600 that may be specifically configured to perform one or more of the processes described herein. As shown in FIG. 6, computing device 600 may include a communication interface 602, a processor 604, a storage device 606, an input/output ("I/O") module 608, and a graphics card 610 communicatively connected via a communication infrastructure 612. While an exemplary computing device 600 is shown in FIG. 6, the components illustrated in FIG. 6 are not intended to be limiting. Additional or alternative components may be used in other embodiments. Components of computing device 600 shown in FIG. 6 will now be described in additional detail.

Communication interface 602 may be configured to communicate with one or more computing devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit (e.g., a CPU) capable of processing data or interpreting, executing, and/or directing execution of one or more of the instructions, processes, and/or operations described herein. Processor 604 may direct execution of operations in accordance with one or more applications 614 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 614 configured to direct processor 604 to perform any of the operations described herein may be stored within storage device 606. In some examples, data may be arranged in one or more databases residing within storage device 606. In certain examples, storage device 606 may maintain surface data, metadata, data streams, video streams, transport streams, and/or any other data received, generated, managed, maintained, used, and/or transmitted by facilities 106 through 116. The storage facility may further include any other data as may be used by facilities 106 through 116 to perform one of more of the operations described herein.

I/O module 608 may include one or more I/O modules configured to receive user input and provide user output. One or more I/O modules may be used to receive input for a single virtual reality experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation. I/O module 608 may be omitted from certain implementations.

In some examples, any of the system components described herein may be implemented by or within one or more components of computing device 600. For example, one or more applications 614 residing within storage device 606 may be configured to direct processor 604 to perform one or more processes or functions associated with cloud server 102, edge computing device 104, client device 106, network 108, client 112, batch layer 114, speed layer 116, serving layer 202, and/or other components described herein. Likewise, any suitable storage facility associated with system 100 may be implemented by or within storage device 606. Accordingly, computing device 600 may represent an exemplary implementation of cloud server 102, edge computing device 104, or client device 106.

Graphics card 610 may include any suitable graphics card (e.g., a commercially available graphics card) having dedicated video decoding hardware (e.g., one or more dedicated video decoders) and a programable GPU 616. Graphics card 610 may include additional components in certain embodiments. Graphics card 610 and/or GPU 616 may be configured to execute and/or assist processor 604 in executing one or more of the exemplary operations described herein. Graphics card 610 may include any suitable number of graphics cards and/or GPUs as may suit a particular implementation.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
    a cloud server configured to provide a service to a client device by way of a network; and
    an edge computing device that is separate from and communicatively coupled to the cloud server, the edge computing device configured to provide, from an edge of the network, a latency-sensitive task associated with the service to the client device;
    wherein the cloud server and the edge computing device are configured to operate on distinct and matching datasets to provide the service to the client device;
    wherein the cloud server is configured to provide a latency-tolerant task associated with the service to the client device in response to a request sent by the client device to the cloud server; and
    wherein the edge computing device is configured to provide the latency-sensitive task associated with the service to the client device in response to a request sent by the client device to the edge computing device.

2. The system of claim 1, wherein the cloud server and the edge computing device are configured to exchange, by way of the network, signals for synchronizing the datasets.

3. The system of claim 1, wherein the distinct and matching datasets have matching states at different points in time.

4. The system of claim 1, wherein:
the cloud server and the edge computing device each receive a data stream;
the edge computing device processes on its copy of the data stream to generate a first of the distinct and matching datasets; and
the cloud server processes on its copy of the data stream to generate a second of the distinct and matching datasets.

5. The system of claim 4, wherein:
the first of the distinct and matching datasets includes real-time views of the data stream; and
the second of the distinct and matching datasets includes batch views of the data stream.

6. The system of claim 5, wherein at least one of the cloud server and the edge computing device is configured to receive the batch views from the cloud server and the real-time views from the edge computing device, and to host the batch views and the real-time views for access by the client device.

7. The system of claim 1, wherein the distinct and matching datasets comprise a first virtual reality data stream received by the cloud server and a second virtual reality data stream received by the edge computing device.

8. The system of claim 1, wherein the edge computing device divides a set of tasks such that a first task included in the set of tasks is performed by the edge computing device and a second task included in the set of tasks is offloaded to the cloud server.

9. The system of claim 1, further comprising:
a client implemented by the client device, the client configured to determine, based at least in part on a tracked latency of data communications between the client device and the edge computing device, whether to perform the latency-sensitive task at the client device or to offload the latency-sensitive task to the edge computing device.

10. An edge computing device comprising:
a communication interface configured to communicate, by way of a network, with a client device and with a cloud server that provides a service to the client device by way of the network;
a processor; and
a non-transitory computer-readable medium storing instructions executable by the processor to direct the edge computing device to:
operate on a first dataset that is distinct from and matches a second dataset operated on by the cloud server to provide the service to the client device; and
provide, from an edge of the network, a latency-sensitive task associated with the service to the client device;
wherein the cloud server is configured to provide a latency-tolerant task associated with the service to the client device in response to a request sent by the client device to the cloud server; and
wherein the edge computing device is configured to provide the latency-sensitive task associated with the service to the client device in response to a request sent by the client device to the edge computing device.

11. The edge computing device of claim 10, wherein the instructions are further executable by the processor to direct the edge computing device to exchange, with the cloud server by way of the network, signals for synchronizing the first and second datasets.

12. The edge computing device of claim 10, wherein the first and second datasets have matching states at different points in time.

13. The edge computing device of claim 10, wherein the instructions are further executable by the processor to direct the edge computing device to divide a set of tasks such that a first task included in the set of tasks is performed by the edge computing device and a second task included in the set of tasks is offloaded to the cloud server.

14. A method comprising:
operating, by an edge computing device located at an edge of a network, on a first dataset that is distinct from and matches a second dataset operated on by a cloud server to provide a service to a client device by way of the network; and
providing, by the edge computing device from the edge of the network to the client device, a latency-sensitive task associated with the service;
wherein the cloud server is configured to provide a latency-tolerant task associated with the service to the client device in response to a request sent by the client device to the cloud server; and
wherein the edge computing device is configured to provide the latency-sensitive task associated with the service to the client device in response to a request sent by the client device to the edge computing device.

15. The method of claim 14, further comprising exchanging, by the edge computing device with the cloud server by way of the network, signals for synchronizing the first and second datasets.

16. The method of claim 14, wherein the first and second datasets have matching states at different points in time.

17. The method of claim 14, further comprising dividing, by the edge computing device, a set of tasks such that a first task included in the set of tasks is performed by the edge computing device and a second task included in the set of tasks is offloaded to the cloud server.

18. The method of claim 14, wherein the distinct and matching datasets comprise a first virtual reality data stream received by the edge computing device and a second virtual reality data stream received by the cloud server.

19. The method of claim 14, further comprising:
receiving, by the edge computing device and from the client device, a request to offload the latency-sensitive task from the client device to the edge computing device; and
providing the latency-sensitive task to the client device in response to the request.

20. The method of claim 14, embodied as computer-executable instructions on at least one non-transitory computer-readable medium.

* * * * *